(12) United States Patent
Rashley et al.

(10) Patent No.: US 12,258,289 B2
(45) Date of Patent: Mar. 25, 2025

(54) SUBMERGED COMBUSTION MELTING EXHAUST SYSTEMS

(71) Applicant: Owens-Brockway Glass Container Inc., Perrysburg, OH (US)

(72) Inventors: Shane T. Rashley, Bowling Green, OH (US); Robert W. Kuhlman, Dundee, MI (US); Richard C. Gobrecht, III, Toledo, OH (US); William Thomas, Toledo, OH (US); Liming Shi, Perrysburg, OH (US)

(73) Assignee: Owens-Brockway Glass Container Inc., Perrysburg, OH (US)

(*) Notice: Subject to any disclaimer, the term of this patent is extended or adjusted under 35 U.S.C. 154(b) by 318 days.

(21) Appl. No.: 17/490,084

(22) Filed: Sep. 30, 2021

(65) Prior Publication Data

US 2022/0098078 A1 Mar. 31, 2022

Related U.S. Application Data

(60) Provisional application No. 63/085,646, filed on Sep. 30, 2020.

(51) Int. Cl.
*C03B 5/23* (2006.01)
*C03B 5/235* (2006.01)
*C03B 5/44* (2006.01)

(52) U.S. Cl.
CPC .............. *C03B 5/2356* (2013.01); *C03B 5/44* (2013.01); *C03B 2211/22* (2013.01)

(58) Field of Classification Search
CPC .................................................. C03B 5/2353
See application file for complete search history.

(56) References Cited

U.S. PATENT DOCUMENTS 2,648,714 A * 8/1953 McBurney ............ F27D 17/003
122/6 A
2,800,175 A * 7/1957 Sharp ..................... F23D 91/02
431/9

(Continued)

FOREIGN PATENT DOCUMENTS

EP 2578547 A2 10/2013
EP 3138820 A1 3/2017
JP 2009120456 6/2009

OTHER PUBLICATIONS

Rue 2011 as found at https://ceramics.onlinelibrary.wiley.com/doi/full/10.1111/j.2041-1294.2011.00070.x (Year: 2011).*

(Continued)

*Primary Examiner* — Jodi C Franklin

(57) ABSTRACT

A submerged combustion melting system includes a furnace including a tank with a floor, a roof, a perimeter wall, and an interior, and burners to melt glass feedstock into molten glass, a batch inlet, a molten glass outlet, and an exhaust outlet. An exhaust system is in fluid communication with the interior of the tank, and includes a flue in fluid communication with the exhaust outlet. A refractory-lined hood may be in fluid communication with the flue, which may be fluid-cooled including fluid-cooled perimeter panels and lower and upper baffles. The hood may include a protrusion that protrudes into a downstream horizontal exhaust path and has an excurvate upper surface to streamline flow of exhaust gas through the hood to prevent gas recirculation and formation of condensate piles in the hood.

31 Claims, 15 Drawing Sheets

(56) References Cited

U.S. PATENT DOCUMENTS

| | | | |
|---|---|---|---|
| 3,592,623 A | 7/1971 | Shepherd | |
| 3,758,267 A * | 9/1973 | Berk | F27D 17/003 266/901 |
| 4,031,819 A * | 6/1977 | Applewhite | C21C 5/40 454/67 |
| 4,275,258 A * | 6/1981 | Harmsen | F27D 1/12 373/76 |
| 4,328,388 A * | 5/1982 | Longenecker | F27B 3/28 373/80 |
| 4,752,938 A * | 6/1988 | Palmquist | C03B 5/0275 373/31 |
| 5,330,161 A * | 7/1994 | Lehr | F27D 9/00 266/158 |
| 5,343,819 A * | 9/1994 | Charest | F23B 50/12 241/600 |
| 5,579,705 A * | 12/1996 | Suzuki | C03B 5/025 110/210 |
| 5,765,489 A | 6/1998 | Hugentobler et al. | |
| 5,898,726 A * | 4/1999 | Matsumoto | F27D 13/002 373/79 |
| 5,905,752 A * | 5/1999 | Sieradzki | F27B 3/085 373/9 |
| 6,059,070 A | 5/2000 | Cudicio et al. | |
| 6,077,473 A * | 6/2000 | Diederich | F27D 17/001 266/158 |
| 6,086,361 A | 7/2000 | Higashi et al. | |
| 6,086,817 A * | 7/2000 | Garvin | C21C 5/40 266/158 |
| 6,126,440 A * | 10/2000 | Argent | F27B 3/263 432/180 |
| 6,207,462 B1 * | 3/2001 | Barclay | G01N 33/42 219/757 |
| 6,250,917 B1 * | 6/2001 | Engelberg | F27B 3/263 432/179 |
| 6,332,411 B1 * | 12/2001 | Skrotskaya | F23L 1/00 110/297 |
| 6,966,268 B2 * | 11/2005 | Kim | F23L 15/00 110/305 |
| 7,273,583 B2 | 9/2007 | Rue et al. | |
| 8,707,740 B2 | 4/2014 | Huber et al. | |
| 9,481,592 B2 | 11/2016 | Huber et al. | |
| 9,776,813 B2 | 10/2017 | McMahon | |
| 9,815,726 B2 | 11/2017 | Huber | |
| 9,957,184 B2 | 5/2018 | Huber et al. | |
| 10,087,097 B2 * | 10/2018 | Charbonneau | C03B 5/24 |
| 10,101,090 B2 * | 10/2018 | Gunner | F27D 3/04 |
| 10,246,362 B2 | 4/2019 | Huber | |
| 10,584,393 B2 | 3/2020 | Dry et al. | |
| 10,669,183 B2 * | 6/2020 | Fayerweather | C03B 5/235 |
| 11,124,430 B2 * | 9/2021 | Lolling | C02F 1/68 |
| 11,427,492 B2 * | 8/2022 | Rashley | F23C 3/004 |
| 11,707,874 B2 * | 7/2023 | Zoppas | B60H 1/00642 264/328.14 |
| 2002/0162358 A1 * | 11/2002 | Jeanvoine | C03B 5/2257 65/135.1 |
| 2003/0015090 A1 * | 1/2003 | Shore | B08B 15/002 96/397 |
| 2003/0027095 A1 * | 2/2003 | Sugimoto | F23D 14/66 432/37 |
| 2005/0236747 A1 | 10/2005 | Rue et al. | |
| 2008/0276652 A1 * | 11/2008 | Bauer | C03B 5/2356 65/134.1 |
| 2009/0176639 A1 * | 7/2009 | Jacques | C03C 8/02 65/335 |
| 2010/0083884 A1 * | 4/2010 | Olin-Nunez | C03B 5/235 110/263 |
| 2010/0242683 A1 * | 9/2010 | Yamaki | C22B 7/04 75/638 |
| 2010/0252776 A1 * | 10/2010 | Farmayan | F23C 9/00 431/4 |
| 2011/0041517 A1 * | 2/2011 | Takagi | B01D 53/62 423/220 |
| 2011/0236846 A1 * | 9/2011 | Rue | F27B 3/205 432/195 |
| 2012/0279353 A1 * | 11/2012 | Englund | C21B 13/10 266/200 |
| 2013/0086950 A1 * | 4/2013 | Huber | C03B 5/193 65/347 |
| 2013/0327092 A1 * | 12/2013 | Charbonneau | C03B 3/023 65/29.21 |
| 2014/0007623 A1 * | 1/2014 | Charbonneau | C03B 37/022 65/495 |
| 2014/0318187 A1 * | 10/2014 | Sborshikov | C03B 3/023 65/347 |
| 2015/0175464 A1 * | 6/2015 | Lefrere | C03B 5/265 65/135.1 |
| 2016/0159675 A1 * | 6/2016 | Demott | F23C 3/004 65/540 |
| 2016/0168001 A1 | 6/2016 | Demott et al. | |
| 2016/0185642 A1 * | 6/2016 | Demott | C03B 5/2356 65/347 |
| 2017/0066672 A1 * | 3/2017 | Huber | C03B 5/2356 |
| 2017/0369352 A1 * | 12/2017 | Huber | C03B 5/20 |
| 2018/0022628 A1 | 1/2018 | Demott et al. | |
| 2018/0029915 A1 | 2/2018 | Huber | |
| 2018/0065877 A1 * | 3/2018 | Faulkinbury | C03B 5/44 |
| 2018/0283789 A1 * | 10/2018 | Kobayashi | C01B 3/46 |
| 2019/0177200 A1 | 6/2019 | Huber | |
| 2019/0194053 A1 | 6/2019 | Demott et al. | |
| 2019/0337834 A1 | 11/2019 | Demott et al. | |
| 2019/0352208 A1 | 11/2019 | Demott et al. | |
| 2020/0079674 A1 | 3/2020 | Demott et al. | |
| 2020/0109075 A1 | 4/2020 | Demott et al. | |
| 2020/0340746 A1 * | 10/2020 | Guillet | F27D 1/16 |
| 2020/0353517 A1 * | 11/2020 | Juranitch | C03B 5/005 |
| 2022/0026150 A1 * | 1/2022 | Peterman | F27D 19/00 |
| 2022/0098076 A1 | 3/2022 | Holmes et al. | |
| 2022/0098078 A1 * | 3/2022 | Rashley | C03B 5/425 |
| 2022/0098080 A1 | 3/2022 | Weil et al. | |
| 2022/0098081 A1 | 3/2022 | Rausch et al. | |
| 2022/0136770 A1 * | 5/2022 | Manasek | F27D 17/002 373/74 |
| 2022/0388883 A1 | 12/2022 | Rashley et al. | |

OTHER PUBLICATIONS

Greenman GMIC as found at http://www.verreonline.fr/Glassman-2009/gmic-greenman.pdf (Year: 2009).*

Combustion consulting (included herein) found at Jan. 31, 2019 with a copyright of 2018 at https://web.archive.org/web/20190131151410/https://www.combustion-consulting.com/en/SBM-Furnace/ referred to herein after as combustion consulting (Year : 2018).*

Submerged combustion exhaust systems (Year: 2004).*

Submerged combustion analysis and devlopment (Year: 2011).*

PCT Int. Search Report and Written Opinion, Int. App. No. PCT/US2021/052792, Int. Filing Date: Sep. 30, 2021, Applicant: Owens-Brockway Glass Container Inc., Mail date: Jan. 24, 2022.

* cited by examiner

FIG. 5

SUBMERGED COMBUSTION MELTING EXHAUST SYSTEMS

TECHNICAL FIELD

This patent application discloses innovations to submerged combustion melting (SCM) systems and, more particularly, to exhaust systems and equipment for SCM furnaces.

BACKGROUND

A submerged combustion melting (SCM) system includes an SCM furnace and an exhaust system to convey exhaust gases away from the furnace. The furnace includes a tank to hold glass, burners in a floor of the tank, a batch inlet at an upstream end of the tank, a molten glass outlet at a downstream end of the tank below a free surface of the molten glass, and an exhaust outlet in the upper portion of the tank above the free surface of the molten glass. The exhaust outlet is in communication with an exhaust conduit of the exhaust system. In an SCM, melting of glass batch materials into molten glass is violent and turbulent, and involves splashing of molten glass up into a condensation zone of the exhaust conduit. The molten glass splashes onto condensed materials on interior surfaces of the exhaust conduit and, eventually, solidifies and accumulates to such an extent that the exhaust conduit can become unacceptably clogged.

BRIEF SUMMARY OF THE DISCLOSURE

A submerged combustion melting system includes a submerged combustion melting furnace and an exhaust system. The furnace includes a tank including a floor, a roof, a perimeter wall extending between the floor and the roof, and an interior. The furnace also includes submerged combustion melting burners extending through the tank to melt glass feedstock into molten glass in the interior of the tank, a batch inlet at an upstream end of the tank, a molten glass outlet at a downstream end of the tank, and an exhaust outlet. The exhaust system is in fluid communication with the interior of the tank, and includes a flue in fluid communication with the exhaust outlet.

In an embodiment, the system includes the flue as a fluid-cooled flue including fluid-cooled perimeter panels, and a refractory-lined hood in fluid communication with, and extending to a hood outlet from, the fluid-cooled flue, and including refractory-lined walls and a dilution air duct inlet. Also in this embodiment, the exhaust system includes a dilution air input duct having an outlet in fluid communication with the dilution air duct inlet of the refractory-lined hood, and non-cooled, non-refractory outlet conduit extending away from the refractory-lined hood.

In another embodiment, the system includes the flue as a fluid-cooled flue with fluid-cooled perimeter panels including a lower vertical segment in fluid communication with the exhaust outlet of the roof of the tank of the submerged combustion melting furnace and having a lower central longitudinal axis, and an upper vertical segment having an upper central longitudinal axis and a flue outlet. The fluid-cooled perimeter panels also include an intermediate oblique segment extending between the lower and upper vertical segments and having an intermediate central longitudinal axis, wherein an offset distance between the lower and upper central longitudinal axes is greater than or equal to a transit section dimension of the fluid-cooled flue.

In a further embodiment, the system includes the flue as a fluid-cooled flue extending along a central longitudinal axis and including fluid-cooled perimeter panels, a lower baffle extending at an oblique angle and intersecting the central longitudinal axis, and an upper baffle extending at another angle different from the oblique angle of the lower baffle and intersecting the central longitudinal axis.

In an additional embodiment, the exhaust system also includes a hood in fluid communication with the flue and including an upstream vertical portion extending upwardly from the flue, and a downstream horizontal portion extending away from the upstream vertical portion to establish a downstream horizontal exhaust path having an exhaust hood outlet. The downstream horizontal portion includes a lower wall with a protrusion that protrudes into the downstream horizontal exhaust path and has an excurvate upper surface to streamline flow of exhaust gas through the hood to prevent gas recirculation and formation of condensate piles in the hood.

BRIEF DESCRIPTION OF THE DRAWINGS

FIG. 5 is an upper perspective view of an exhaust flue of the system of FIG. 1;

DETAILED DESCRIPTION

In general, the presently disclosed subject matter is directed to configuring an exhaust system for a submerged combustion melting furnace to reduce solidification and accumulation of glass on interior surfaces of the exhaust system and thereby reducing clogging of the exhaust system. Below two example embodiments will be described.

Figure 1:
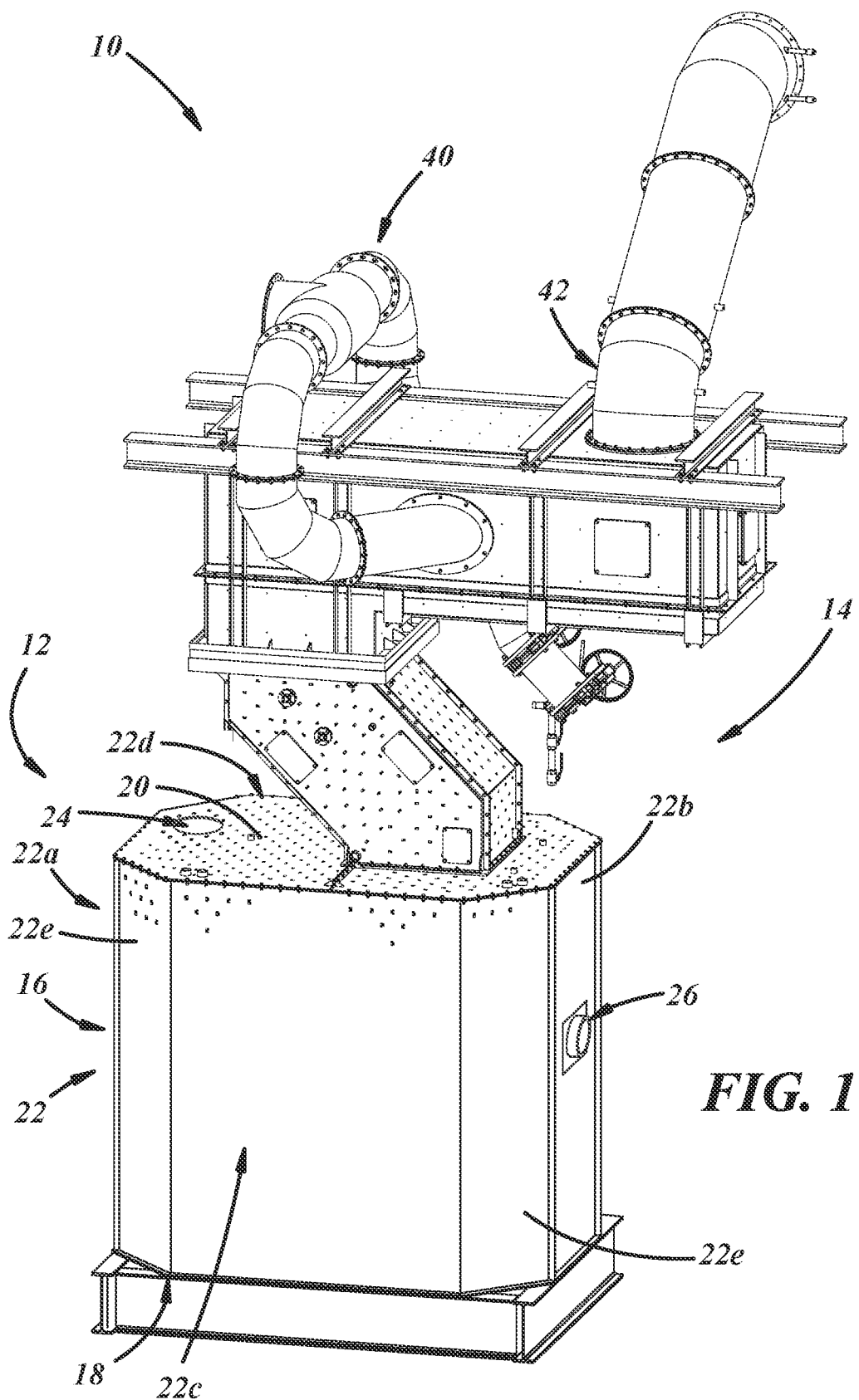
FIG. 1 is an upper perspective view of a submerged combustion melting system in accordance with an illustrative embodiment of the present disclosure.

With specific reference to the drawing figures, FIG. 1 shows an illustrative embodiment of a submerged combustion melting (SCM) system 10 that includes an SCM furnace 12, and an exhaust system 14 for the furnace 12. The SCM system 10 may be used to melt glass, metal, waste, or any other material suitable for melting. Those of ordinary skill in the art will recognize that the SCM system 10 may be supplied with utilities including air and other gases, electricity, water and other fluids, and the like, in any suitable manner.

The furnace 12 includes a tank 16 including a floor 18, a roof 20, and a perimeter wall 22 extending between the floor 18 and the roof 20. The perimeter wall 22 may include a front end wall 22a, a rear end wall 22b, side walls 22c,d, and angled walls 22e between the side walls 22c,d and the end walls 22a,b. In other embodiments, any configuration of the perimeter wall 22 may be used including walls constituting a purely rectangular shape, or a single cylindrical wall, or any other suitable configuration.

Figure 2:
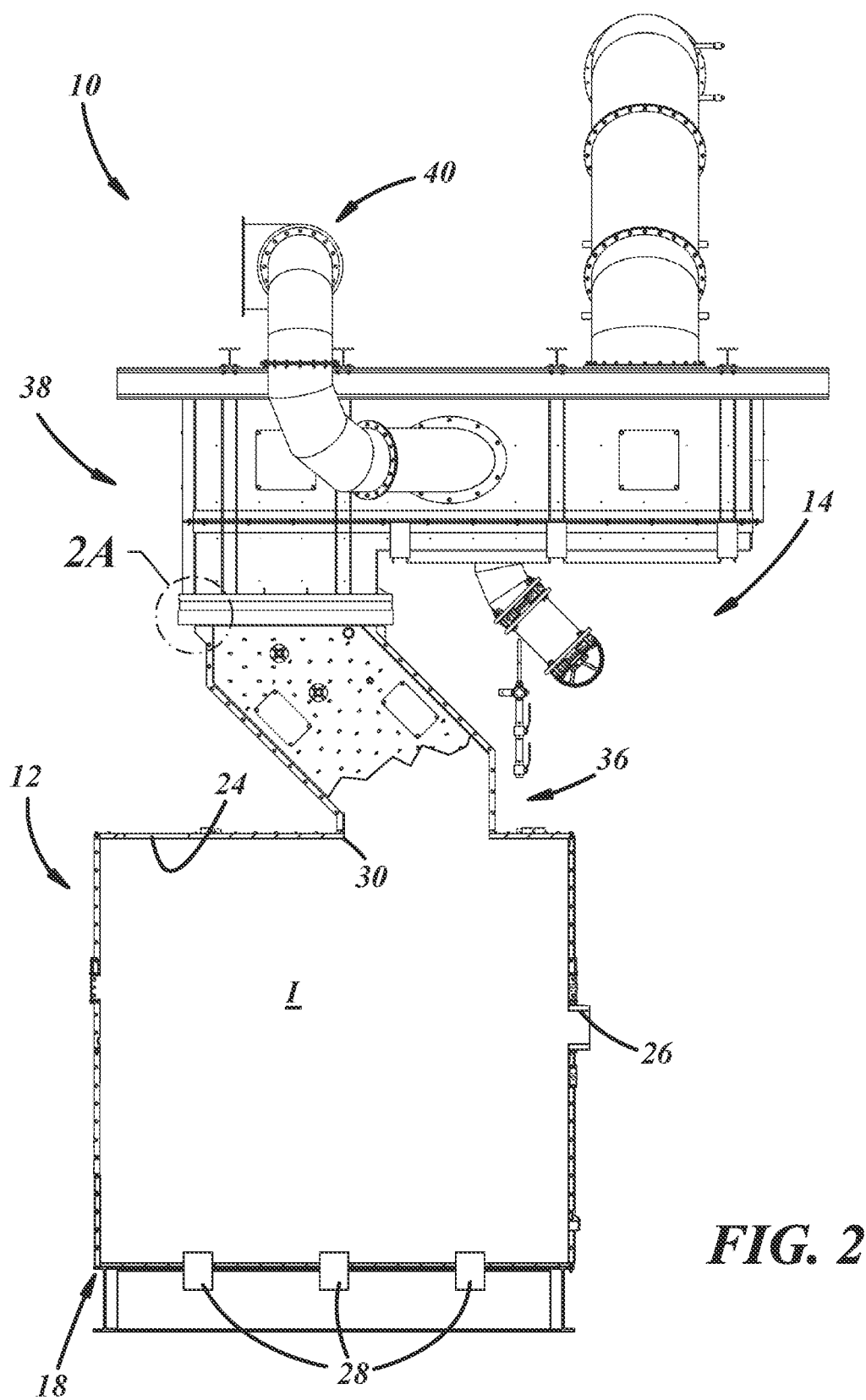
FIG. 2 is a cross-sectional view of the system of FIG. 1.
Figure 3:
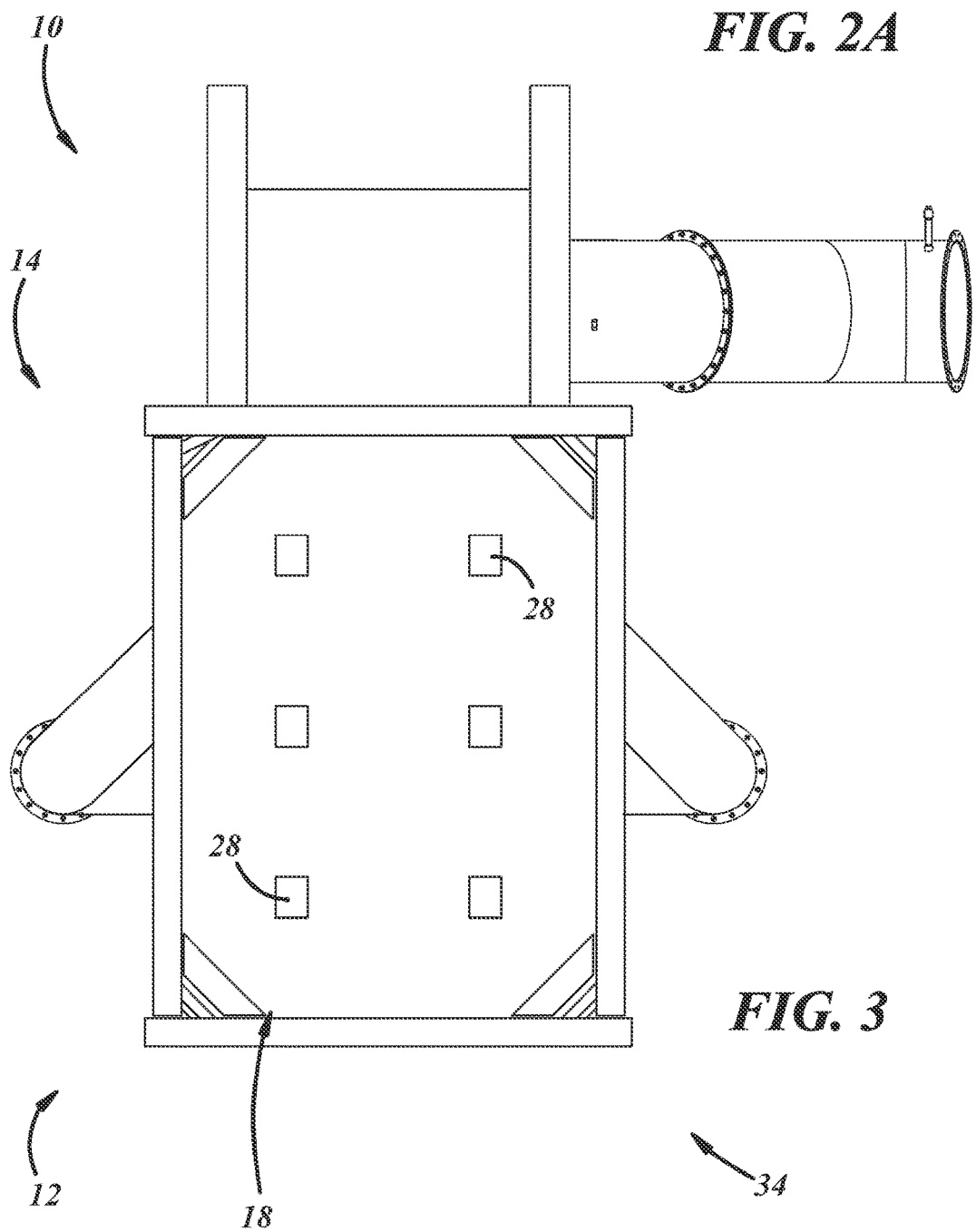
FIG. 3 is a bottom view of the system of FIG. 1.

Now with reference to FIG. 2, the tank 16 also includes an interior I to receive feedstock, melt the feedstock into molten material, and contain the molten material produced from the feedstock. The furnace 12 also includes a batch inlet 24 at an upstream end of the tank 16, a molten glass outlet 26 at a downstream end of the tank 16, submerged combustion melting burners 28 extending through the tank 16 to melt the feedstock into the molten glass in the interior I of the tank 16, and an exhaust outlet 30 through the roof 20. The burners 28 may extend through the floor 20 of the tank 16. Also, with reference to FIG. 3, the furnace 12 may include various conduits including fuel, oxidant, and burner coolant lines 32 coupled to the burners 28, and a coolant manifold 34, and the like.

With reference again to FIG. 2, the exhaust system 14 is in fluid communication with the interior I of the tank 16, and generally includes a fluid-cooled flue 36 coupled to and in fluid communication with the exhaust outlet 30 of the SCM furnace 12, and a refractory-lined hood 38 coupled to and in fluid communication with the fluid-cooled flue 36 at a downstream end of the flue 36. The exhaust system 14 also includes a dilution air input duct 40 coupled to and in fluid communication with the refractory-lined hood 38.

Figure 4:
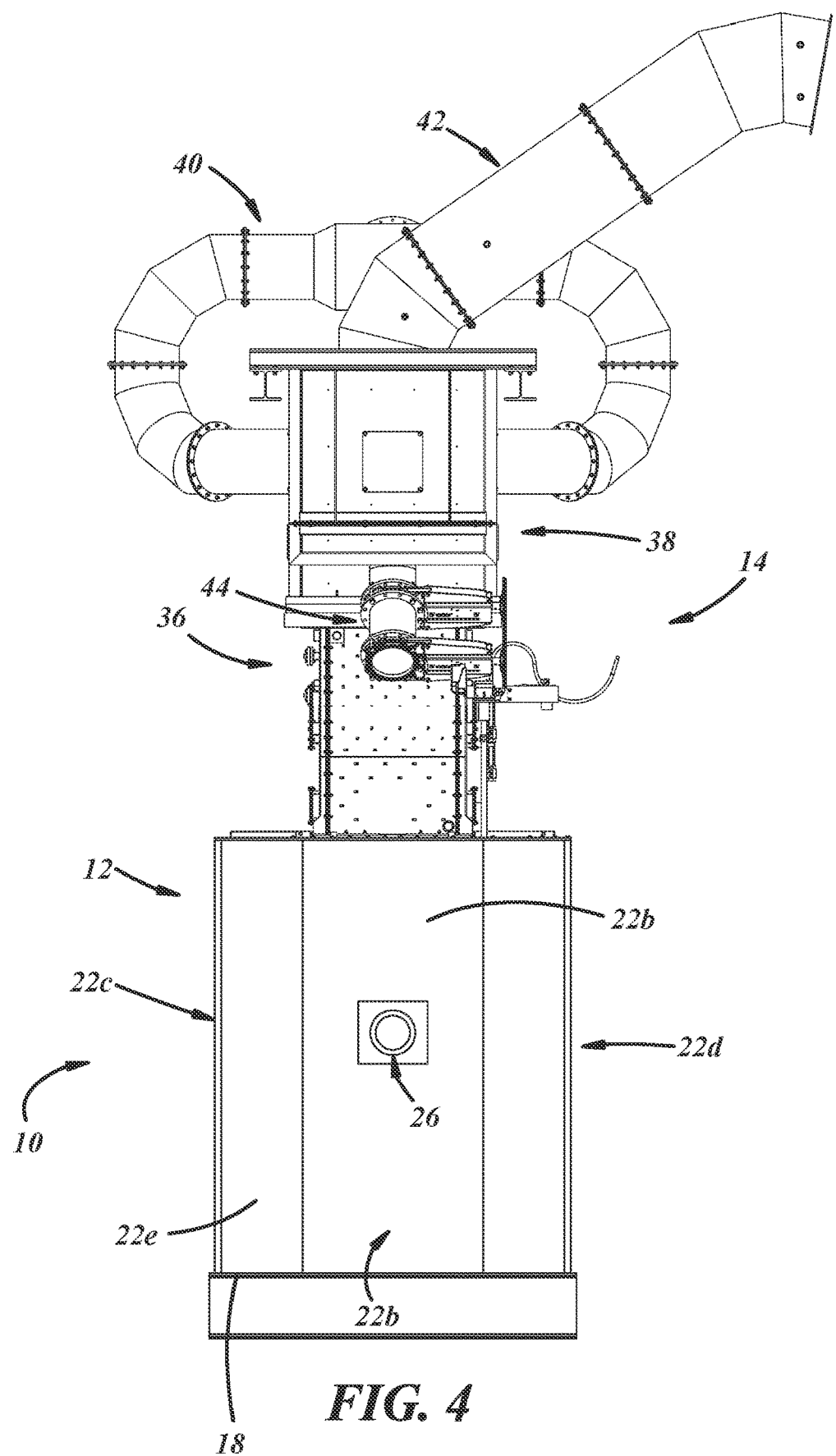
FIG. 4 is a rear end view of the system of FIG. 1.

With reference to FIG. 4, the exhaust system 14 also includes a non-cooled, non-refractory outlet conduit 42 coupled to and in fluid communication with the refractory-lined hood 38, and a dust cleanout duct 44 coupled to and in fluid communication with the refractory-lined hood 38. The fluid-cooled flue 36 extends upwardly from the roof 20 of the furnace tank 16 at the exhaust outlet 30.

Figure 5:
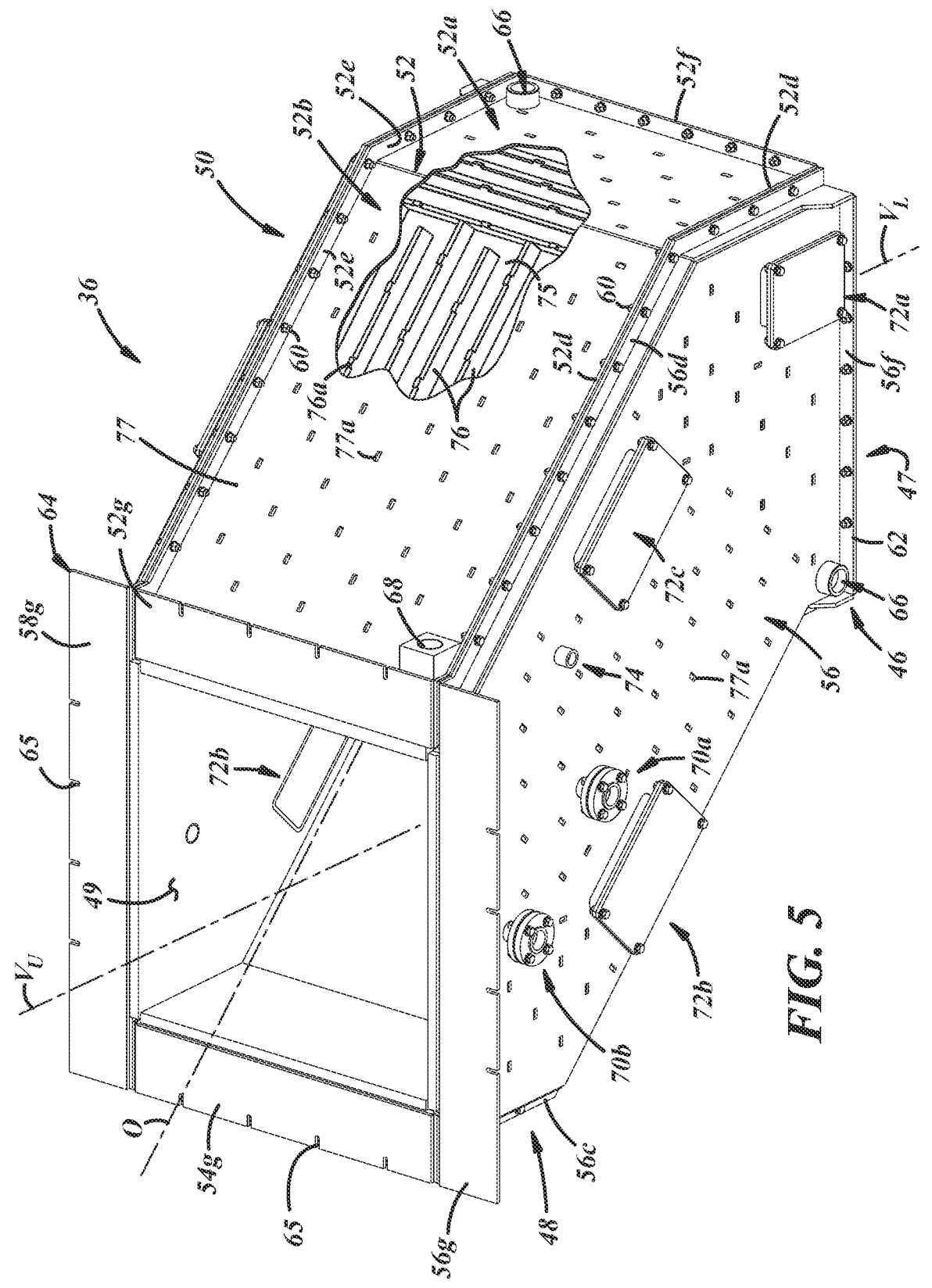
Figure 6:
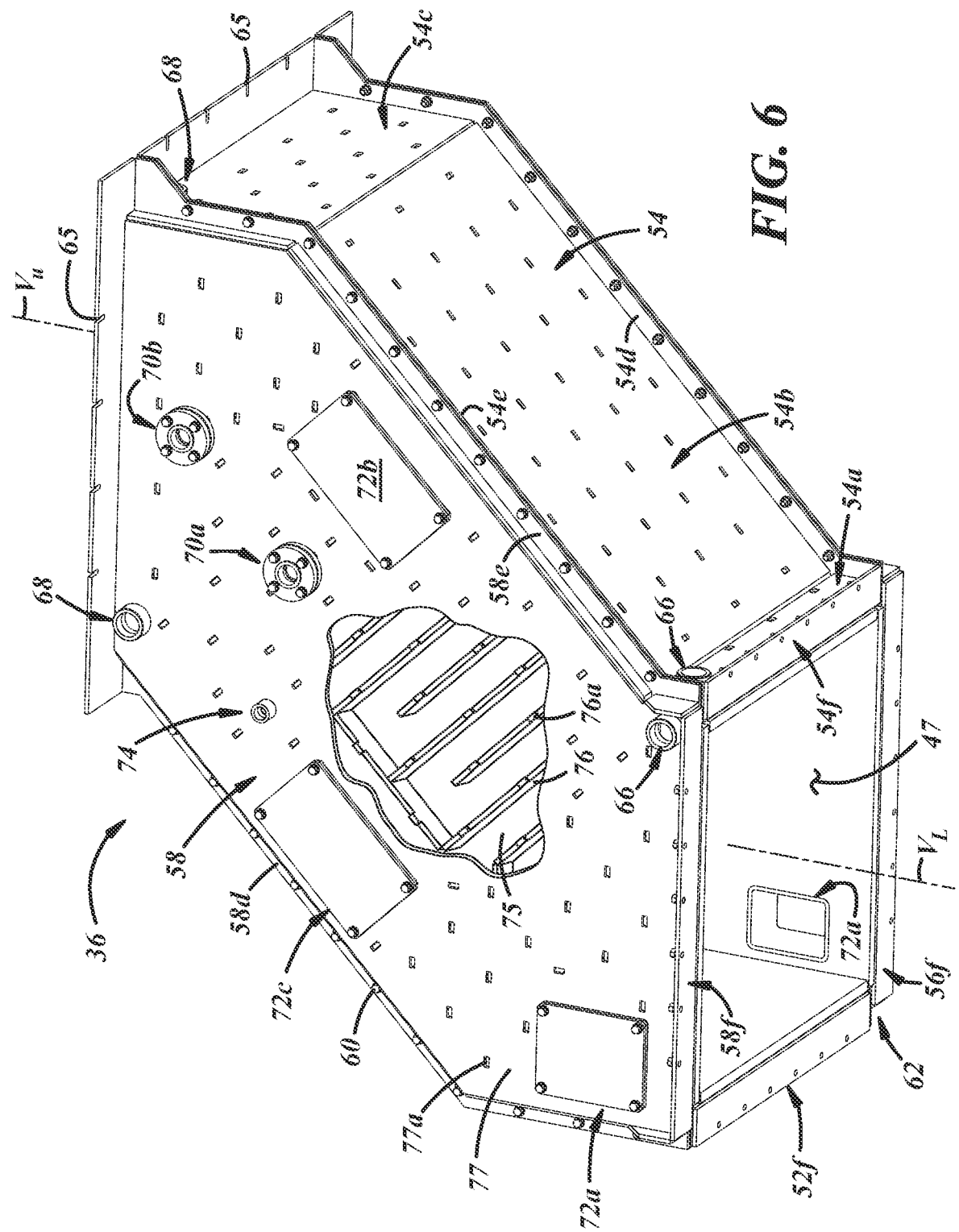
FIG. 6 is a lower perspective view of the exhaust flue of the system of FIG. 1.

With reference to FIGS. 5 and 6, a lower portion or vertical segment 46 of the flue 36 has a flue inlet 47 configured to be in direct fluid communication with the exhaust outlet 30 of the roof 20 of the tank 16 (FIG. 2) and extends upwardly along a lower central vertical axis $V_L$. An upper portion or vertical segment 48 of the flue 36 extends upwardly along an upper central vertical axis $V_U$ to a flue outlet 49. An intermediate portion or oblique segment 50 of the flue 36 extends upwardly along an intermediate central oblique axis O extending from the lower central vertical axis $V_L$ and to the upper central vertical axis $V_U$. An offset distance between the lower and upper central longitudinal axes is greater than or equal to a width or transit section dimension of the fluid-cooled flue. As used herein the term "vertical" means vertical within plus or minus five angular degrees. Likewise, as used herein the term "horizontal" means horizontal within plus or minus five angular degrees.

With continued reference to FIGS. 5 and 6, the fluid-cooled flue 36 includes fluid-cooled perimeter walls or panels that may be configured to both provide structure to the exhaust system 14 and provide cooling to the exhaust system 14. The various components of the panels can be formed of materials suitable for withstanding a high temperature environment of the melting furnace, for example, steel. In the illustrated embodiment, the flue 36 includes an upstream or front panel 52, an oppositely disposed downstream or rear panel 54, and side panels 56, 58 coupled to and between the front and rear panels 52, 54. The terms "front" and "rear" are used with reference to the exhaust flow direction through the flue 36, and not with reference to the front and the rear of the melter tank. The front panel 52 includes a shorter vertical lower segment 52a, and a longer oblique intermediate segment 52b. Conversely, the rear panel 54 includes a shorter vertical lower segment 54a, a longer oblique intermediate segment 54b, and a longer vertical upper segment 54c.

The panels 52, 54, 56, 58 include perimetral mounting flanges 52d,e, 54d,e, 56d,e, 58d,e to facilitate coupling of the side panels 56, 58 to the front and rear panels 52, 54. The mounting flanges 52d,e, 54d,e, 56d,e, 58d,e carry fasteners 60 for fastening the flanges 52d,e, 54d,e, 56d,e, 58d,e together. Also, the panels 52, 54, 56, 58 include lower radially outwardly extending flanges 52f, 54f, 56f, 58f that constitute a lower mounting flange 62 to facilitate mounting of the flue 36 on the furnace tank 16 (FIG. 2). The lower mounting flange 62 may carry fasteners (not shown) for fastening to the furnace tank 16 (FIG. 2). Likewise, the panels 52, 54, 56, 58 include upper radially outwardly extending flanges 52g, 54g, 56g, 58g that constitute an upper mounting flange 64 to facilitate mounting of the exhaust hood 38 (FIG. 2) on the flue 36. The upper mounting flange 64 may include open-ended notches 65 to accept fasteners (not shown) for fastening to the exhaust hood 38 (FIG. 2).

The flue panels 52, 54, 56, 58 are also configured to receive, convey, and transmit fluid into, through, and out of the panels 52, 54, 56, 58. For example, the panels 52, 54, 56, 58 include inlets 66 at lower portions thereof, outlets 68 at upper portions thereof, and serpentine channels extending therebetween. The inlets and outlets 66, 68 can be configured in any suitable manner to be coupled to inlet and outlet fluid supply and return lines (not shown). In addition, the side panels 56, 58 may include upstream and downstream pressure sensor ports 70a,b, as well as upstream, downstream, and intermediate clean-out ports 72a,b,c, and a temperature sensor or thermocouple port 74. The flue panels 52, 54, 56, 58 can be configured to work with coolant including water, various heat transfer fluids, solvents, solutions, $CO_2$, ionic fluid, molten salts, or the like.

The serpentine channels may be established by baffles 76 extending between interior and exterior walls 75, 77 of the panels 52, 54, 56, 58. The baffles 76 may include projections 76a extending into or through corresponding openings 77a in the interior walls 75 and/or exterior walls 77. The projections 76a may include, for example, tabs, posts, studs, screws, rivets, slugs, bolts, welds, welded pieces, or the like. The projections 76a may be interference fit, fastened, welded, and/or coupled in any other suitable manner to the walls 75, 77. The projections 76a and the corresponding openings are depicted as having a rectangular cross-section but they may be configured with a variety of cross-sections and/or shapes, including circular, oval, square, triangular, other types of polygons, or the like. The walls may be produced in the manner disclosed in U.S. patent application Ser. No. 16/590,065, ("Cooling Panel for a Melter"), filed on Oct. 1, 2019, and/or in U.S. patent application Ser. No. 16/993,825 ("Cast Cullet-Based Layer on Wall Panel for a Melter"), both of which are assigned to the assignee hereof and are incorporated herein by reference in their entireties.

Figure 7:
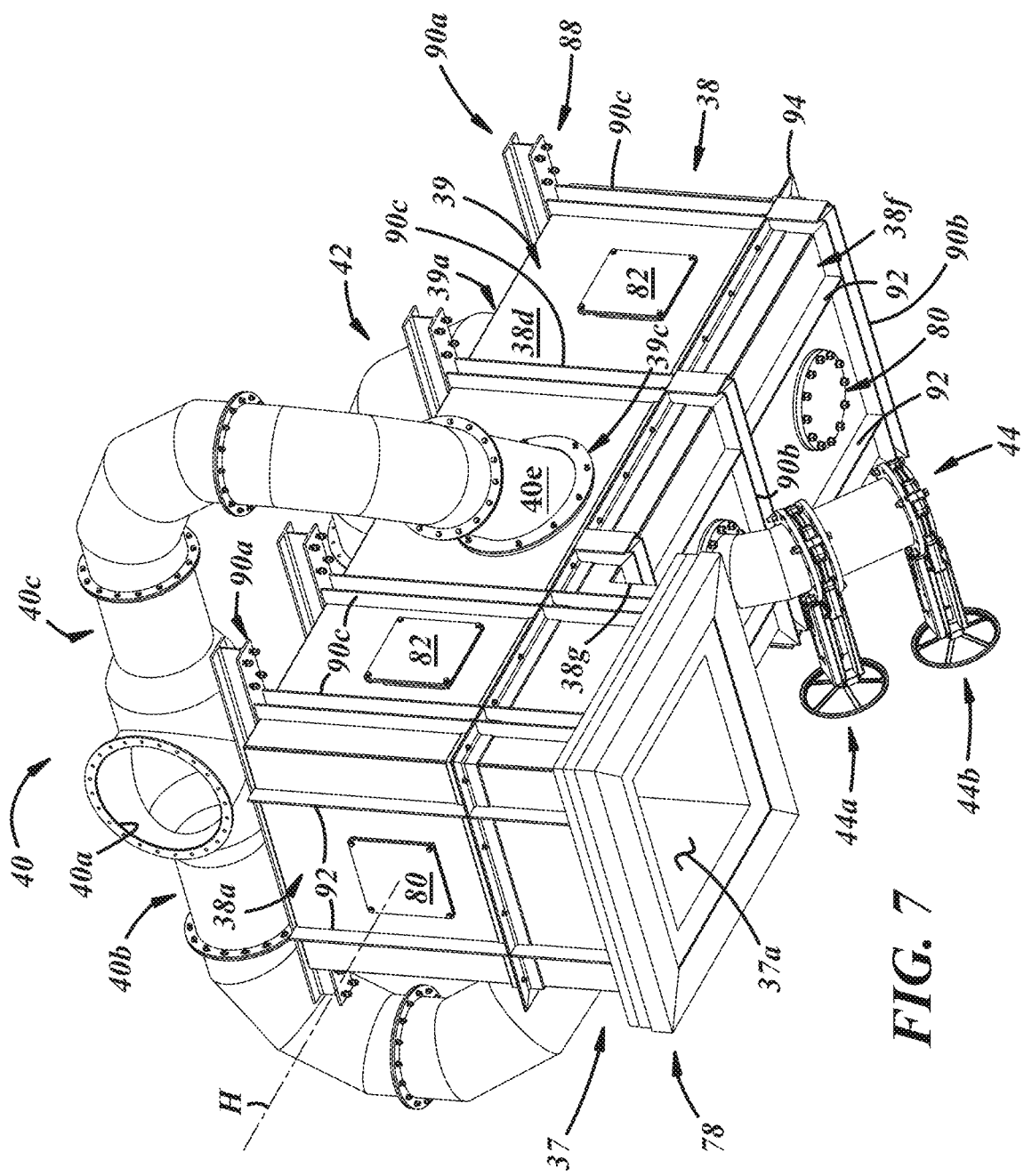
FIG. 7 is a lower perspective view of an exhaust hood of the system of FIG. 1.
Figure 8:
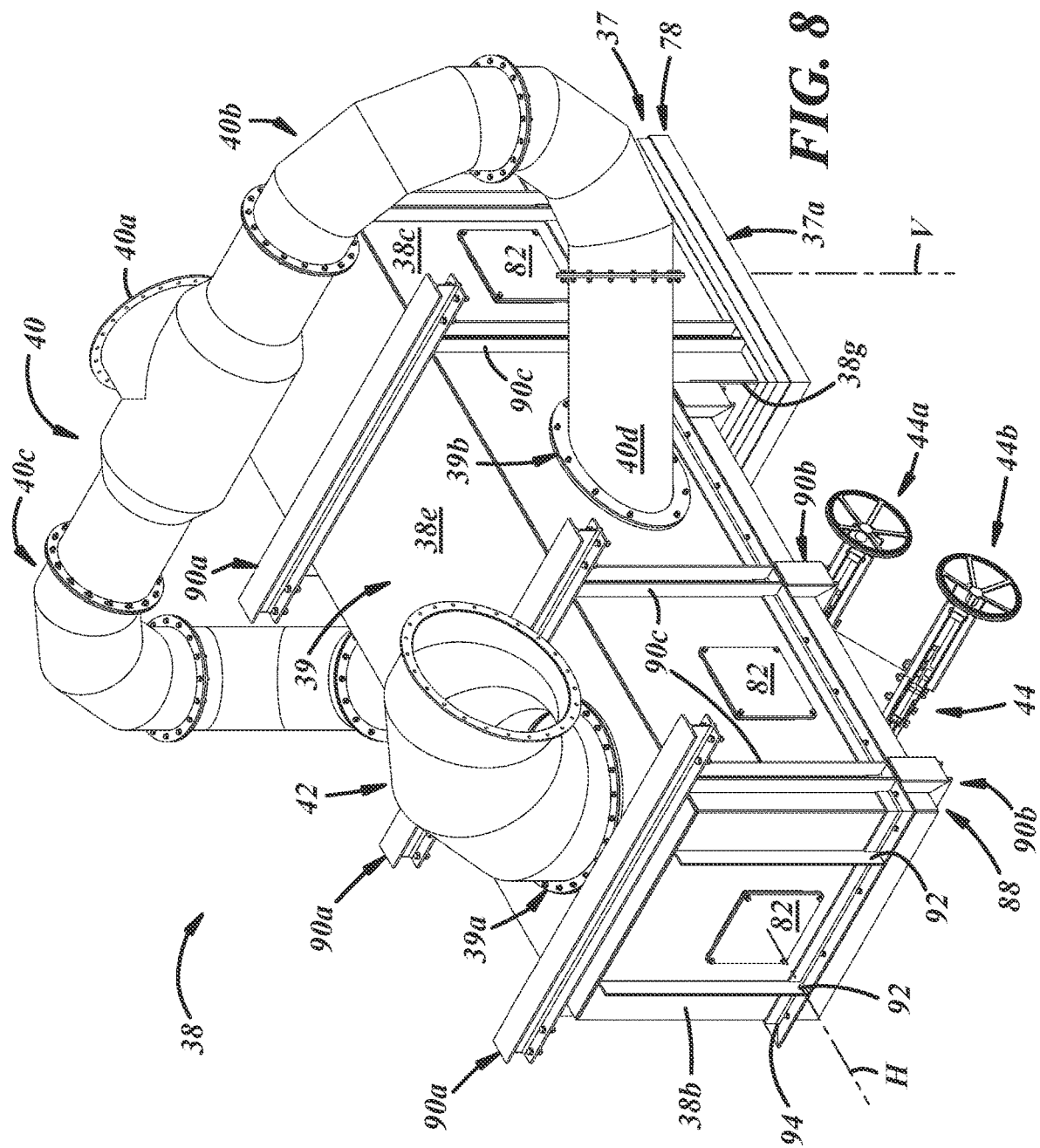
FIG. 8 is an upper perspective view of the exhaust hood of the system of FIG. 1.

The refractory-lined hood 38, with reference now to FIGS. 7 and 8, is in fluid communication with, and extends from, the fluid-cooled flue 36 (FIG. 2), and includes a hood inlet 37a and a hood outlet 39a. More specifically, the refractory-lined hood 38 includes an upstream vertical portion 37 extending upwardly along a vertical axis V from the fluid-cooled flue 36 (FIG. 2) and establishing the hood inlet 37a, and a downstream horizontal portion 39 extending along a horizontal axis H away from the upstream vertical portion 37 and establishing the hood outlet 39a. The dilution air input duct 40 includes an inlet 40a, side branches 40b,c extending away from the inlet 40a, and outlets 40d,e terminating the side branches 40b,c and in fluid communication with dilution air duct inlets 39b,c of the refractory-lined hood 38. The non-cooled, non-refractory outlet conduit 42 extends away from the refractory-lined hood 38 at the hood outlet 39a. The inlet and outlet conduits 40, 42 may include metal ductwork of any kind suitable for use with an SCM furnace. The dust cleanout duct 44 includes two gate valves, an upstream gate valve 44a, and a downstream gate valve 44b, thereby allowing removal of dust from the hood without shutting down the melter.

Figure 2A:
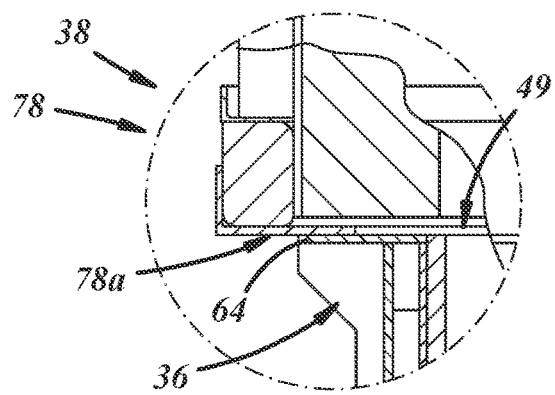
FIG. 2A is an enlarged fragmentary side view of a portion of the system of FIG. 1, taken from circle 2A of FIG. 2.

With continued reference to FIGS. 7 and 8, the hood 38 includes a front wall 38a, a rear wall 38b oppositely disposed from the front wall 38a, side walls 38c,d extending between the front and rear walls 38a,b, and an upper wall 38e and a lower wall 38f extending between the side walls 38c,d. The vertical segment 37 of the hood 38 also has an inlet extension wall 38g and carries an expansion joint 78 for coupling to the outlet of the exhaust flue 36 (FIG. 1). With reference to FIG. 2A (3$^{rd}$ sheet of drawings), the expansion joint 78 locates against the outlet 49 of the exhaust flue 36 and, more specifically, includes a radially inwardly extending flange 78a that locates against the outlet flange 64 of the exhaust flue 36. With reference again to FIGS. 7 and 8, the hood outlet 39a is in the upper wall 39e of the downstream horizontal portion 39 and vertically opposite a downstream condensate cleanout port 80 in the lower wall 38f of the downstream horizontal portion 39. The dilution air duct inlets 39b,c extend through the corresponding side walls 38c,d of the downstream horizontal portion 39. In one or more locations upstream and/or downstream of the dilution air duct inlets 39b,c, the sidewalls 38c,d and/or the bottom wall 38f may include clean-out ports 82. Likewise, the front wall 38a and/or the rear wall 38b may include clean-out ports 82.

Figure 9A:
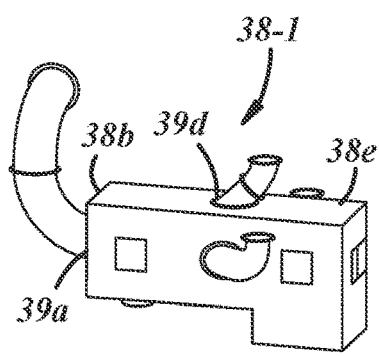
FIG. 9A is an upper perspective view of another exhaust hood of the system of FIG. 1.

With reference to FIG. 9A, a hood 38-1 includes the hood outlet 39a provided in the rear wall 38b, and an additional upper dilution air duct inlet 39d extends through the upper wall 38e.

Figure 9B:
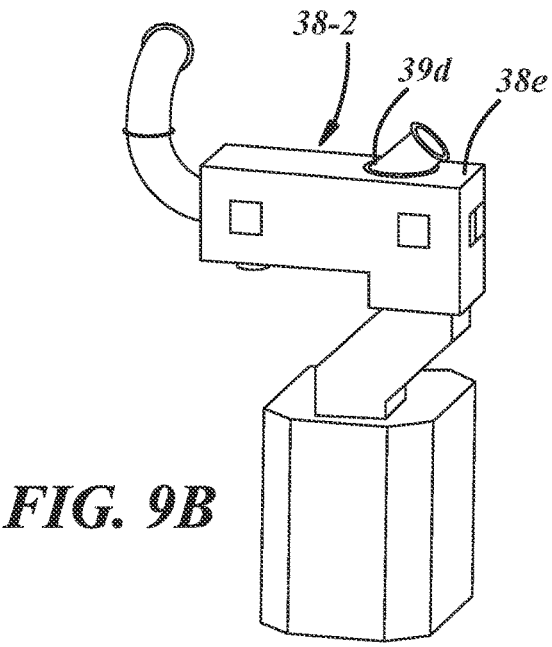
FIG. 9B is an upper perspective view of yet another exhaust hood of the system of FIG. 1.

With reference to FIG. 9B, a hood 38-2 includes one or both of the side dilution air duct inlets of FIGS. 8 and 9a omitted, and the upper dilution air duct inlet 39d extending through the upper wall 38e.

Figure 10A:
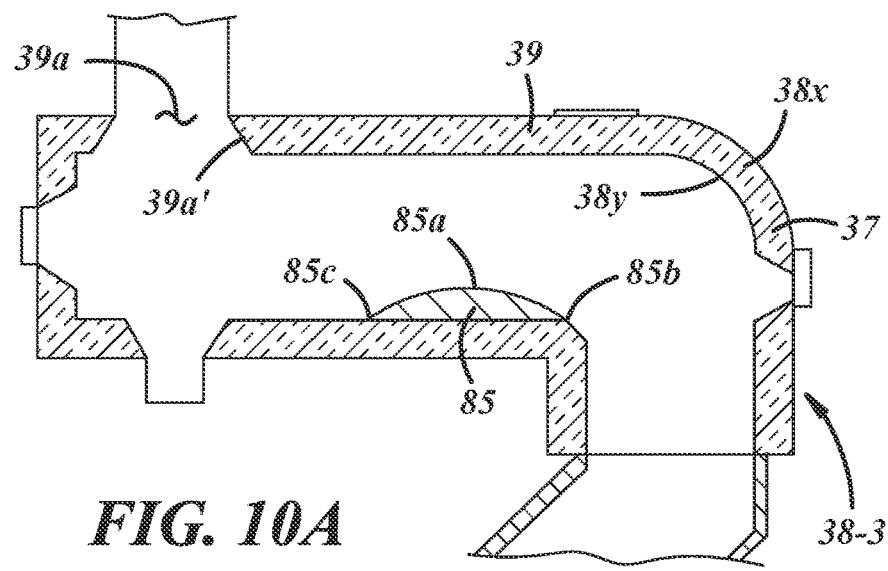
FIG. 10A is a vertical sectional view of another exhaust hood of the system of FIG. 1.
Figure 10B:
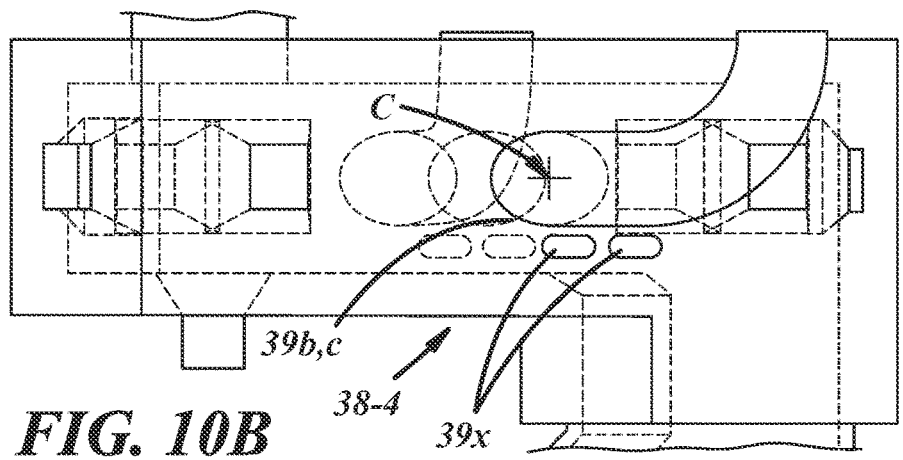
FIG. 10B is a fragmentary side view of yet another exhaust hood of the system of FIG. 1.
Figure 10C:
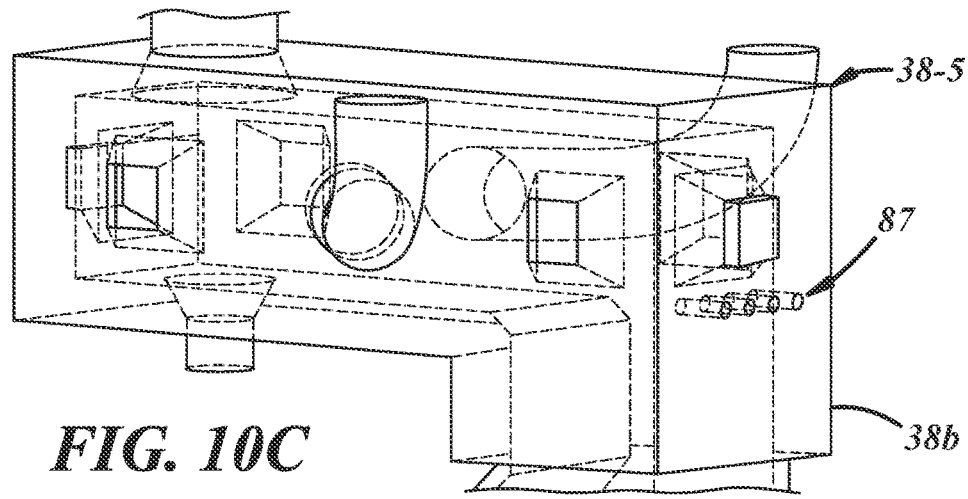
FIG. 10C is a fragmentary side view of still another exhaust hood of the system of FIG. 1.
Figure 10:
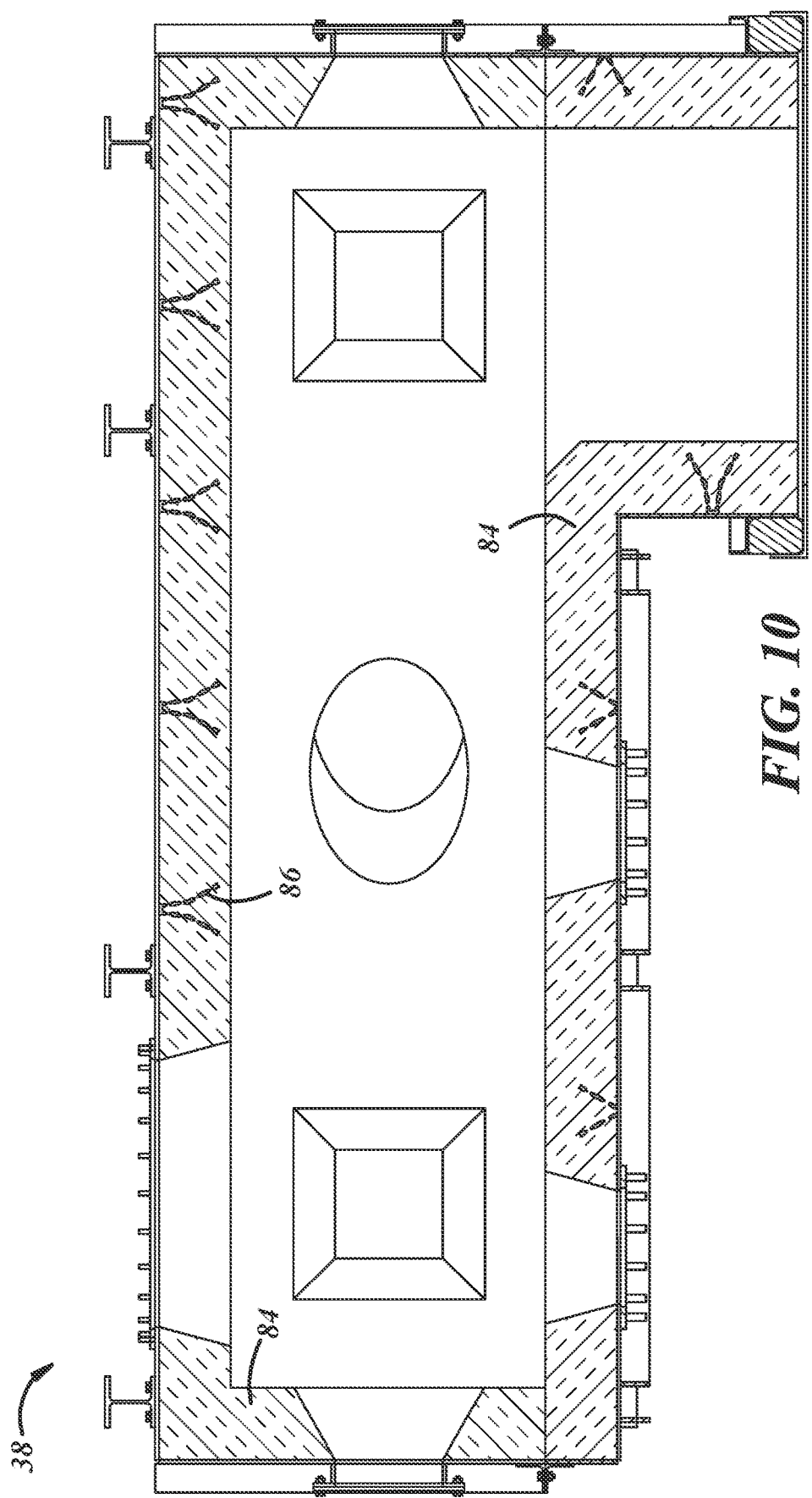
FIG. 10 is a vertical sectional view of the exhaust hood of the system of FIG. 1.
Figure 11:
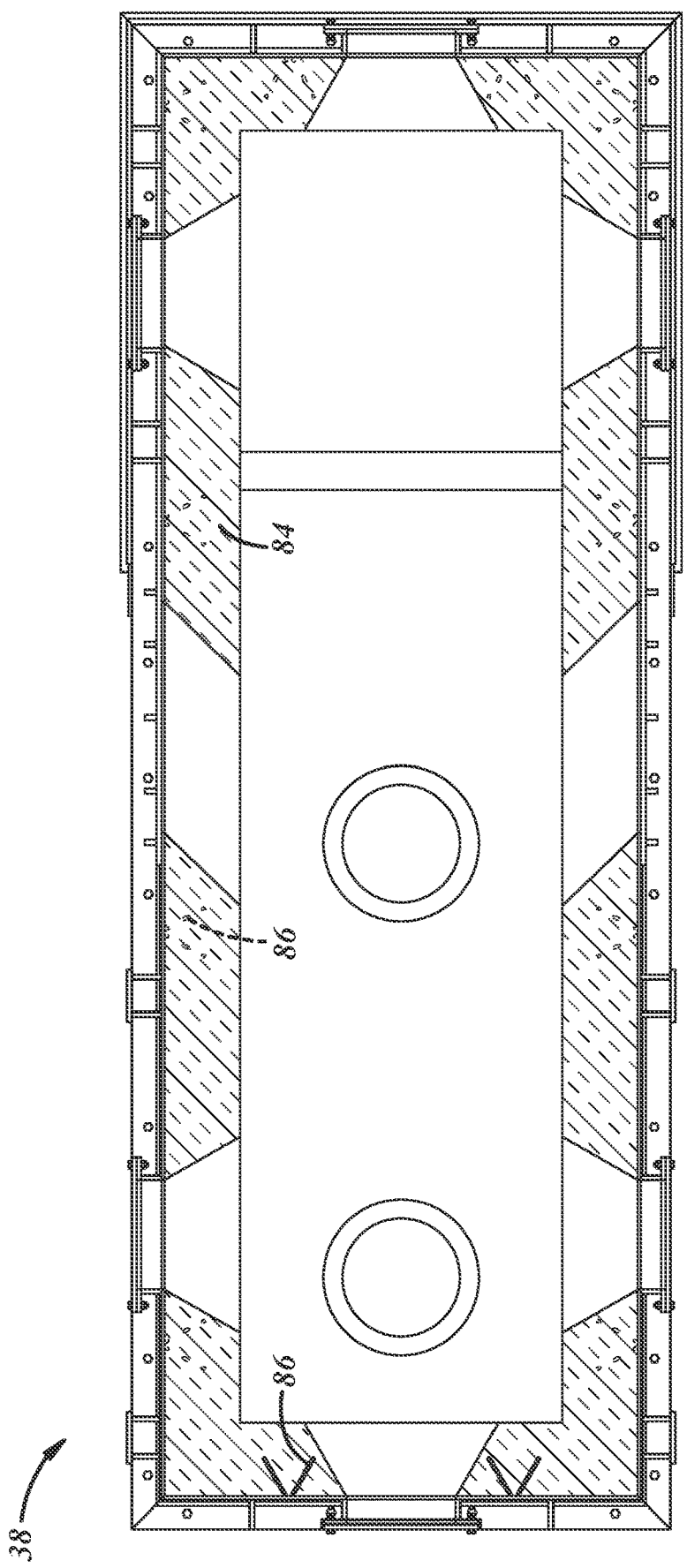
FIG. 11 is a horizontal sectional view of the exhaust hood of the system of FIG. 1.

With reference to FIGS. 10 and 11, the hood 38 includes a refractory lining 84 applied to and carried by interior surfaces of the various walls of the hood 38. To facilitate support of the refractory lining 84, anchors 86 are fixed to the interior surfaces of the walls and extend into the refractory lining 84. The refractory lining 84 may be about eight inches thick.

With reference again to FIGS. 7 and 8, the hood 38 also includes an exo skeletal support structure 88 to facilitate mounting of the hood 38 to a factory building, to support the walls of the hood 38, and/or to reinforce the walls of the hood 38. The support structure 88 includes a plurality of upper beams 90a and a plurality of lower beams 90b extending transversely with respect to the horizontal axis H, and a plurality of side beams 90c extending between the upper and lower beams 90a,b. The support structure also includes a plurality of reinforcement ribs 92 extending along some of the walls. The support structure may include a horizontal seam 94 and corresponding mounting flanges to facilitate assembly of the structure. The beams 90a,b,c, reinforcement ribs 92, and/or the seam 94 may be welded, fastened, or otherwise coupled to the corresponding walls in any suitable manner.

With reference to FIG. 10A, a hood 38-3 may be modified to include a protrusion 85 that protrudes into the downstream horizontal exhaust path and has an excurvate upper surface 85a to streamline flow of exhaust gas through the hood 38-3 to prevent gas recirculation and formation of condensate piles in the hood 38-3. Also, an outer junction 38x between the upstream vertical portion 37 of the hood 38 and the downstream horizontal portion 39 of the hood 38 is curved and defines an incurvate inner surface 38y. Further, the upper wall 38e of the downstream horizontal portion 39 includes the exhaust hood outlet 39a wherein the exhaust hood outlet 39a has a sloped circumferential surface 39a' that converges in a downstream direction.

The protrusion 85 may be a block of material carried by the refractory lining 84 of the lower wall 38f. The material may be metal, refractory, or any other material suitable for use in an SCM exhaust system. The excurvate upper surface 85a may be hemispherical, and an upstream-most edge 85b and a downstream-most edge 85c, wherein the upstream-most edge 85b is closer to the upstream vertical portion of the hood 38 than the downstream-most edge 85c is to the exhaust hood outlet 39a as measured along a central longitudinal axis of the exhaust path. The highest point of the protrusion 85 may be in the middle of the protrusion 85. A ratio of a maximum height of the protrusion 85 to a vertical height of the passage of the downstream horizontal portion of the duct 38 is between 10 and 30 percent including all ranges, subranges, values, and endpoints of that range. The aforementioned ratio may be about 20 percent, e.g. 15-25 percent. A ratio of a maximum diameter or width of the protrusion 85 to the vertical height of the passage of the downstream horizontal portion of the duct 38 is between 80 and 120 percent including all ranges, subranges, values, and endpoints of that range. The aforementioned ratio may be about 100 percent, e.g. 90 to 110 percent.

With reference to FIG. 10B, a hood 38-4 may be modified to include, in addition to the dilution air duct inlets 39b,c of FIGS. 7 and 8, dilution air ports 39x in at least one of the side walls or a bottom wall of the downstream horizontal portion of the hood 38-4, in addition to the dilution air duct inlets 39b,c. The air inlet ports 39x may be located upstream of central axes C of the dilution air duct inlets 39b,c, and the ports 39x are smaller than the dilution air duct inlets 39b,c. The ports 39x may be of circular, square, polygonal, or any other suitable shape. Preferably, each side wall has one to four ports, and the bottom wall has one to four ports. The air inlet ports 39x may be supplied with dilution air via piping, fittings, valving, controls, and any other equipment suitable for use with an SCM exhaust system.

With reference to FIG. 10C, a hood 38-5 may be modified to include at least one fluid jet 87 extending through the rear end wall 38b of the upstream vertical portion of the exhaust hood 38-5 and configured to deliver bursts of gas to break up or prevent condensation in the exhaust hood 38-5. The at least one fluid jet 87 may include two, three, four, or more jets 87 that may be aligned in a linear array or configured in any other suitable manner. The fluid jet(s) 87 may include high speed jets, i.e., 15 meters/second jet velocity or higher. The jet(s) 87 may be provided via jet lances, that may be cooled or uncooled, and may be operated according to a pulsation frequency. The jet flow direction is substantially the same as the exhaust flow direction and the jets can be adjusted to direct jet flow at an angle with respect to horizontal between −30 degrees and +30 degrees, including all ranges, subranges, values, and endpoints of that range. The jet(s) 87 should be spaced above a bottom inside surface of the bottom wall of the duct. The fluid jet(s) 87 may be supplied with any fluid suitable for use with an SCM exhaust system, e.g., air or water, and using piping, fittings, valving, controls, and any other equipment suitable for use with fluid jets for an SCM exhaust system.

Figure 12:
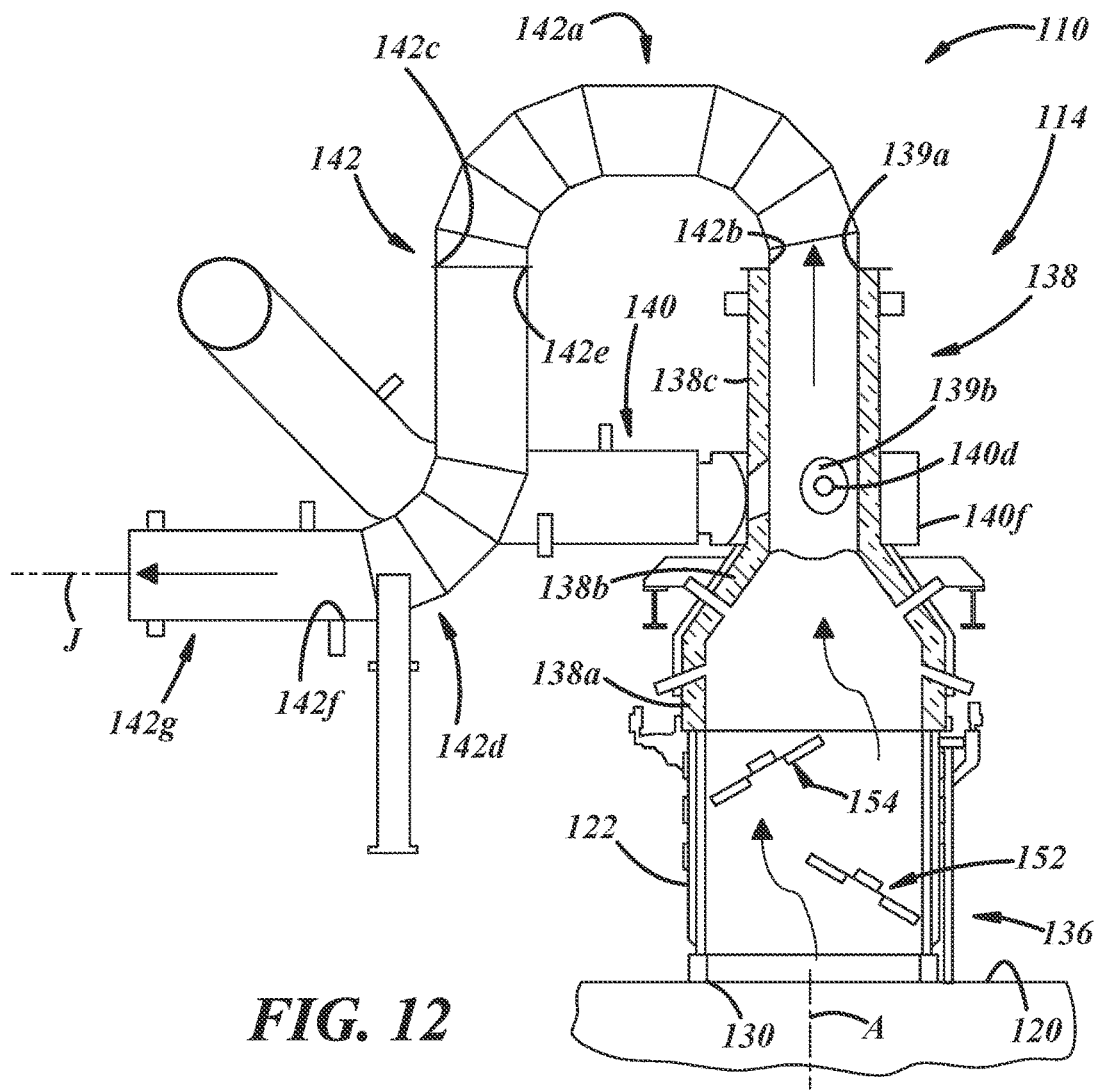
FIG. 12 is a cross-sectional view of an exhaust system for a submerged combustion melting system in accordance with another illustrative embodiment of the present disclosure.

FIG. 12 (on ninth sheet of drawings) shows another illustrative embodiment of a submerged combustion melting system 110. This embodiment is similar in many respects to the embodiment of FIGS. 1-11 and like numerals among the embodiments generally designate like or corresponding elements throughout the several views of the drawing figures. Accordingly, the descriptions of the embodiments are incorporated into one another, and description of subject matter common to the embodiments generally may not be repeated here.

The system 110 includes an exhaust system 114 including a fluid-cooled flue 136, a refractory-lined hood 138, a dilution air input duct 140, and non-cooled, non-refractory outlet conduit 142.

The fluid-cooled flue 136 is in fluid communication with a furnace exhaust outlet 130, extends upwardly from a furnace roof 120 along a central longitudinal axis A, and includes fluid-cooled perimeter panels 122, a lower baffle 152 extending upwardly at an oblique angle and intersecting the central longitudinal axis A, and an upper baffle 154 extending upwardly at another oblique angle and intersecting the central longitudinal axis A such that the baffles 152, 154 overlap one another in a lateral direction perpendicular to the axis A. One or both of the baffles 152, 154 may be non-cooled in an example embodiment. In another example embodiment, one or both of the baffles 152, 154 may be fluid cooled, for example, liquid cooled or gas cooled, for instance, water cooled or air cooled.

The refractory-lined hood 138 is in fluid communication with the fluid-cooled flue 136, extends upwardly from the fluid-cooled flue 136 along the central longitudinal axis A to a hood outlet 139a, and includes refractory-lined perimeter walls 138a, refractory-lined obliquely angled walls 138b extending upwardly and inwardly from the perimeter walls 138a, and a cylindrical conduit 138c extending upwardly from the obliquely angled walls 138b and including a dilution air duct inlet 139b extending transversely therethrough.

The dilution air input duct 140 has one or more outlets 140d in fluid communication with the dilution air duct inlet 139b of the cylindrical conduit 138c of the refractory-lined hood 138. The dilution air input duct 140 may include an annular portion 140f encircling the cylindrical conduit 138c.

The non-cooled, non-refractory outlet conduit 142 extends away from the refractory-lined hood 138 and includes an inverted bight 142a having a bight inlet 142b in fluid communication with the hood outlet 139a of the refractory-lined hood 138 and a bight outlet 142c. The conduit 142 also include a J-shaped section 142d extending downwardly from the bight outlet 142c and having an inlet 142e at an upper end and an outlet 142f at a lower end. The conduit 142 further includes a horizontal section 142g in fluid communication with the outlet 142f of the J-shaped section 142d and extending away therefrom along a longitudinal axis J below a level of the dilution air duct inlet 139b of the hood 138 and above the fluid-cooled flue 136.

Figure 13:
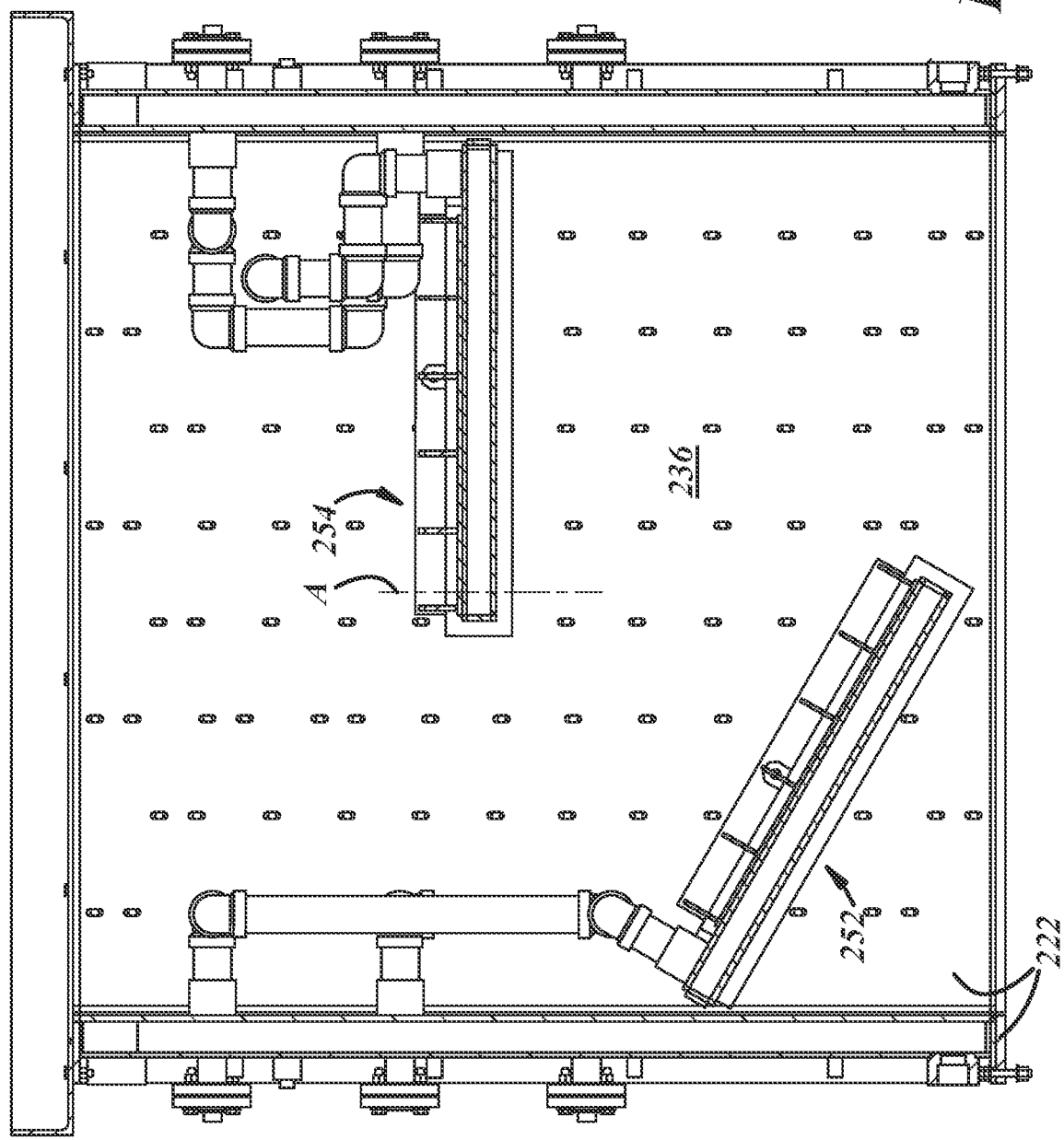
FIG. 13 is a fragmentary interior view of another exhaust flue for a submerged combustion melting system in accordance with yet another illustrative embodiment of the present disclosure.
Figure 14:
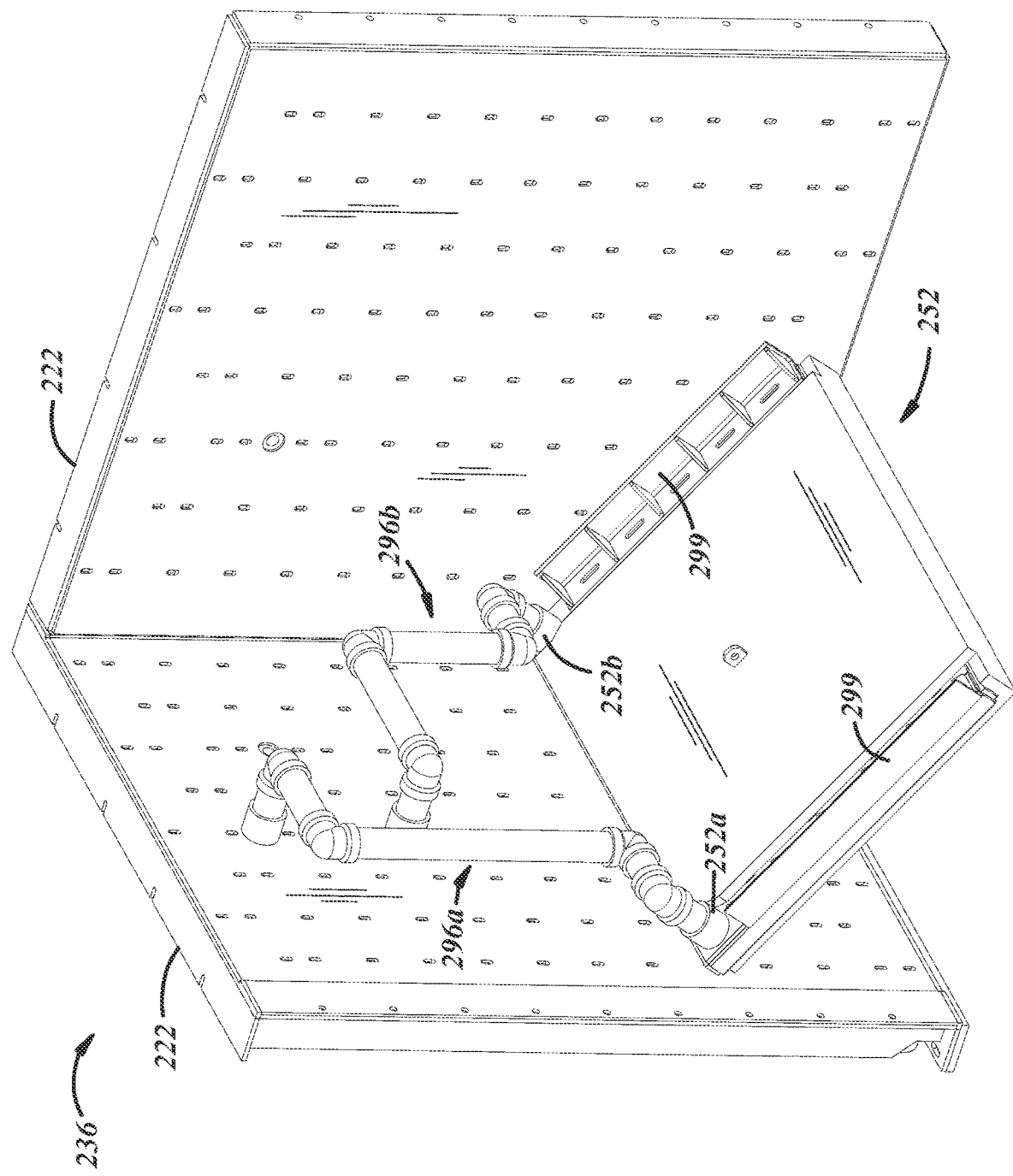
FIG. 14 is a fragmentary perspective view of the exhaust flue of FIG. 13.
Figure 15:
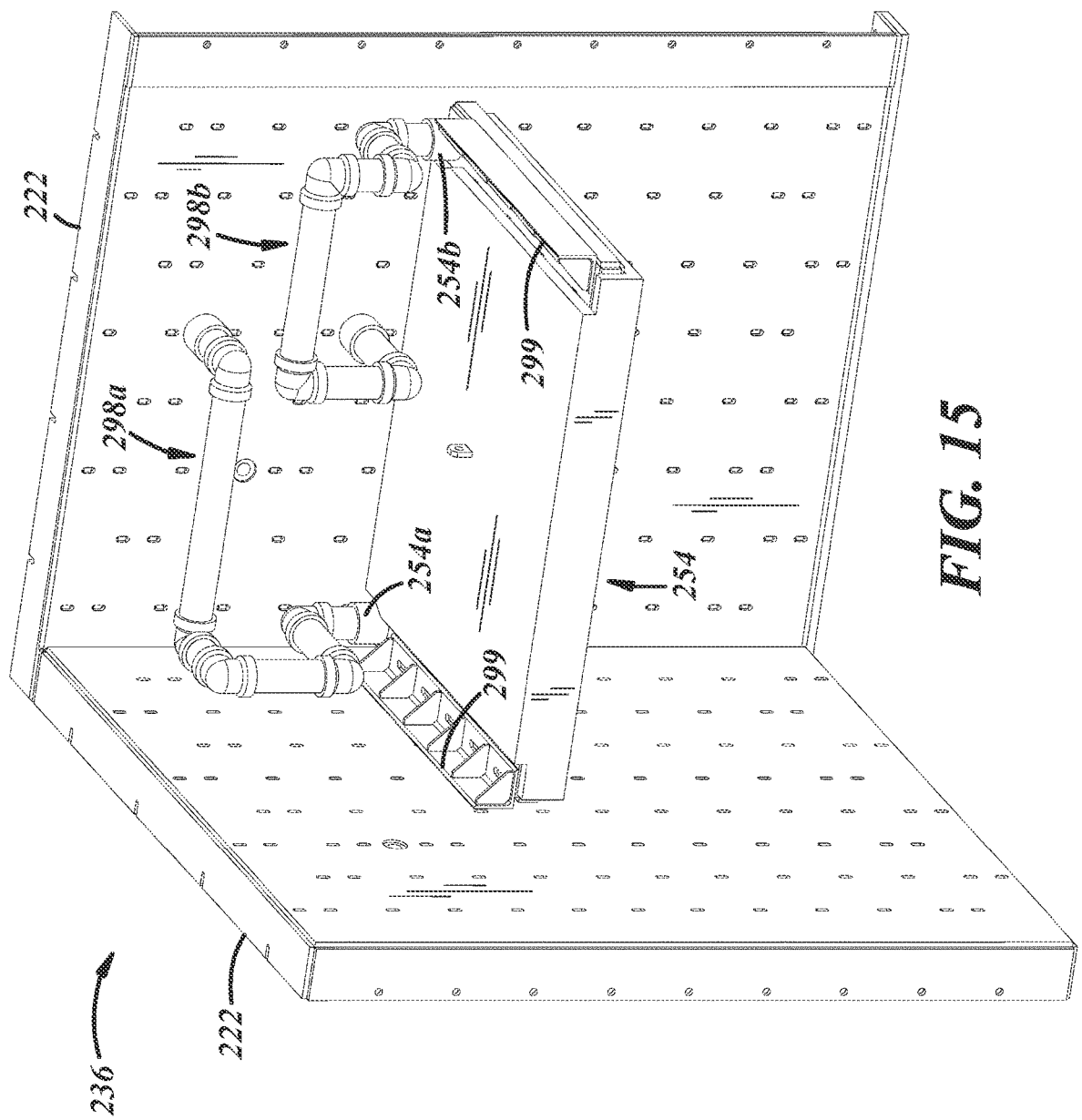
FIG. 15 is another fragmentary perspective view of the exhaust flue of FIG. 13.

FIGS. 13-15 show another illustrative embodiment of a fluid-cooled flue 236. This embodiment is similar in many respects to the embodiment of FIGS. 1-12 and like numerals among the embodiments generally designate like or corresponding elements throughout the several views of the drawing figures. Accordingly, the descriptions of the embodiments are incorporated into one another, and description of subject matter common to the embodiments generally may not be repeated here.

With reference to FIGS. 13-15, the fluid-cooled flue 236 includes fluid-cooled perimeter panels 222, a lower baffle 252 extending downwardly at an oblique angle and intersecting a central longitudinal axis A, and an upper baffle 254 extending horizontally and intersecting the central longitudinal axis A such that the baffles 252, 254 overlap one another in a lateral direction perpendicular to the axis A. The baffles 252, 254 are fluid cooled, liquid cooled or gas cooled, for instance, water cooled or air cooled, in an example embodiment. In another example embodiment, one or both of the baffles 252, 254 may not be fluid cooled.

With reference to FIGS. 14 and 15, the baffles 252, 254 are water tight and include internal baffles (not shown) establishing serpentine flow paths including inlets 252a, 254a and outlets 252b, 254b in fluid communication with supply piping 296a, 298a and return piping 296b, 298b extending through perimeter panels 222 of the flue 236. Of course, the inlets 252a, 254a may be swapped with the outlets 252b, 254b. The baffles 252, 254 may be supported by angle brackets 299 that may be coupled to shoulders of the baffles 252, 254 and to internal panels of the perimeter panels 222 of the flue 236 via fasteners, welds, or any other suitable means (not shown).

With each of the embodiments described above, an exhaust flue includes obliquely and/or horizontally angled portions, walls, and/or baffles, that eliminate a direct path for molten glass splash to reach up into an exhaust system condensation zone, e.g., an exhaust hood, thereby reducing condensation accumulation in a dilution air portion of the system.

The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:
1. A submerged combustion melting system, comprising:
a submerged combustion melting furnace, including:

a tank including a floor, a roof, a perimeter wall extending between the floor and the roof, and an interior, submerged combustion melting burners extending through the tank to melt glass feedstock into molten glass in the interior of the tank, a batch inlet at an upstream end of the tank, a molten glass outlet at a downstream end of the tank, and an exhaust outlet; and an exhaust system in fluid communication with the interior of the tank, and including:

a fluid-cooled flue in fluid communication with the exhaust outlet, and including fluid-cooled perimeter panels, a refractory-lined hood in fluid communication with, and extending to a hood outlet from, the fluid-cooled flue, and including refractory-lined walls and a dilution air duct inlet, wherein the refractory-lined hood includes a vertical portion configured to extend upwardly from the fluid-cooled flue and a horizontal portion configured to extend away from the vertical portion and to the hood outlet, a dilution air input duct having an outlet in fluid communication with the dilution air duct inlet of the refractory-lined hood, and non-cooled, non-refractory outlet conduit extending away from the refractory-lined hood.

2. The system of claim 1, wherein the fluid-cooled flue extends upwardly from the roof of the tank along a first central longitudinal vertical axis, a central longitudinal oblique axis extending from the first central longitudinal vertical axis, and a second central longitudinal vertical axis extending from the central longitudinal oblique axis.

3. The system of claim 1, wherein the refractory-lined hood also includes the vertical portion downstream of and extending upwardly from the fluid-cooled flue, and the horizontal portion downstream of and extending away from the vertical portion to the hood outlet.

4. The system of claim 1, wherein the dilution air duct inlet extends through at least one of the refractory-lined walls of the horizontal portion.

5. The system of claim 1, wherein the hood outlet is in an upper wall of the horizontal portion and vertically opposite a condensate cleanout port in a lower wall of the horizontal portion.

6. The system of claim 1, wherein the fluid-cooled perimeter panels include a lower vertical segment in fluid communication with the exhaust outlet of the roof of the tank and with a lower central longitudinal axis, an upper vertical segment with an upper central longitudinal axis and a flue outlet, and an intermediate oblique segment extending between the lower and upper vertical segments and having an intermediate central longitudinal axis, wherein an offset distance between the lower and upper central longitudinal axes is greater than or equal to a transit section dimension of the fluid-cooled flue.

7. The system of claim 1, wherein the fluid-cooled flue extends upwardly from the roof of the tank along a central longitudinal axis and the refractory-lined hood extends upwardly from the fluid-cooled flue along the central longitudinal axis.

8. The system of claim 1, wherein the refractory-lined walls of the refractory-lined hood include refractory-lined perimeter walls, refractory-lined obliquely angled walls extending upwardly and inwardly from the refractory-lined perimeter walls, and a conduit extending upwardly from the refractory-lined obliquely angled walls.

9. The system of claim 8, wherein the dilution air duct inlet extends transverselythrough the conduit.

10. The system of claim 1, wherein the non-cooled, non-refractory outlet conduit includes an inverted bight having a bight inlet in fluid communication with the hood outlet of the refractory-lined hood and also having a bight outlet, a J-shaped section extending downwardly from the bight outlet and having an inlet at an upper end and also having an outlet at a lower end, and a horizontal section in fluid communication with the outlet of the J-shaped section and extending away therefrom along a longitudinal axis below a level of the dilution air duct inlet of the refractory-lined hood and above the fluid-cooled flue.

11. The system of claim 1, wherein the fluid-cooled perimeter panels have a lower non-cooled baffle extending upwardly at an oblique angle and intersecting a central longitudinal axis, and an upper non-cooled baffle extending upwardly at another oblique angle and intersecting the central longitudinal axis.

12. The system of claim 1, wherein the dilution air duct inlet extends through refractory material of at least one of the refractory-lined walls.

13. A submerged combustion melting system, comprising:

a submerged combustion melting furnace, including:

a tank including a floor, a roof, a perimeter wall extending between the floor and the roof, and an interior, submerged combustion melting burners extending through the tank to melt glass feedstock into molten glass in the interior of the tank, a batch inlet at an upstream end of the tank, a molten glass outlet at a downstream end of the tank, and an exhaust outlet in the roof of the tank; and an exhaust system in fluid communication with the interior of the tank, and including:

a fluid-cooled flue in fluid communication with the exhaust outlet, and having fluid-cooled perimeter panels including:

a lower vertical segment in fluid communication with the exhaust outlet of the roof of the tank of the submerged combustion melting furnace and having a lower central longitudinal vertical axis, an upper vertical segment having an upper central longitudinal vertical axis and a flue outlet, and an intermediate oblique segment extending between the lower and upper vertical segments and having an intermediate central longitudinal oblique axis, wherein an offset distance between the lower and upper central longitudinal axes is greater than or equal to a transit section dimension of the fluid-cooled flue, a refractory-lined hood in fluid communication with the fluid-cooled flue, and including a vertical portion downstream of and extending upwardly from the fluid-cooled flue along the upper central longitudinal vertical axis and a horizontal portion downstream of and extending away from the vertical portion to a hood outlet, and including refractory-lined walls and a dilution air duct inlet extending through at least one of the perimeter walls of the horizontal portion, and
a dilution air input duct having an outlet in fluid communication with the dilution air duct inlet of the refractory-lined hood,
wherein the horizontal portion includes a lower wall with a protrusion that protrudes into a downstream horizontal exhaust path within the horizontal portion and has an excurvate upper surface to streamline flow of exhaust gas through the refractory-lined hood to prevent gas recirculation and formation of condensate piles in the refractory-lined hood.

14. The system of claim 13, wherein the exhaust system further comprises:
non-cooled, non-refractory outlet conduit extending away from the refractory-lined hood at the hood outlet, which is in an upper wall of the horizontal portion and vertically opposite a condensate cleanout port in a lower wall of the horizontal portion.

15. The system of claim 13, wherein the fluid-cooled flue is liquid-cooled and the fluid-cooled perimeter panels are liquid-cooled perimeter panels.

16. A submerged combustion melting system, comprising:
a submerged combustion melting furnace, including:
a tank including a floor, a roof, and a perimeter wall extending between the floor and the roof,
submerged combustion melting burners extending through the tank to melt glass feedstock into molten glass,
a batch inlet at an upstream end of the tank,
a molten glass outlet at a downstream end of the tank, and
an exhaust outlet; and
an exhaust system in fluid communication with the exhaust outlet of the tank, and including:
a fluid-cooled flue in fluid communication with the exhaust outlet, extending along a central longitudinal axis, and including:
fluid-cooled perimeter panels,
a liquid-cooled lower baffle extending at an oblique angle and intersecting the central longitudinal axis, and
a liquid-cooled upper baffle extending at another angle different from the oblique angle of the liquid-cooled lower baffle and intersecting the central longitudinal axis such that the baffles overlap one another in a lateral direction perpendicular to the central longitudinal axis.

17. The system of claim 16, wherein the exhaust system further comprises:
a refractory-lined hood in fluid communication with the fluid-cooled flue, extending upwardly from the fluid-cooled flue along the central longitudinal axis to a hood outlet, and including refractory-lined perimeter walls, refractory-lined obliquely angled walls extending upwardly and inwardly from the refractory-lined perimeter walls, and a cylindrical conduit extending upwardly from the refractory-lined obliquely angled walls and including a dilution air duct inlet extending transversely therethrough; and
a dilution air input duct having an outlet in fluid communication with the dilution air duct inlet of the cylindrical conduit of the refractory-lined hood.

18. The system of claim 17, wherein the exhaust system further comprises:
non-cooled, non-refractory outlet conduit extending away from the refractory-lined hood and including an inverted bight having a bight inlet in fluid communication with the hood outlet of the refractory-lined hood and a bight outlet, a J-shaped section extending downwardly from the bight outlet and having an inlet at an upper end and an outlet at a lower end, and a horizontal section in fluid communication with the outlet of the J-shaped section and extending away therefrom along a longitudinal axis below a level of the dilution air duct inlet of the hood and above the fluid-cooled flue.

19. The system of claim 16, wherein the lower baffle extends at an upward oblique angle or a downward oblique angle, and the upper baffle extends horizontally or at an upward oblique angle.

20. The system of claim 16, wherein at least one of the baffles is supplied with coolant via inlet and outlet piping extending through at least one of the fluid-cooled perimeter panels, and is coupled to at least one of the fluid-cooled perimeter panels.

21. A submerged combustion melting system, comprising:
a submerged combustion melting furnace, including:
a tank including a floor, a roof, a perimeter wall extending between the floor and the roof, and an interior,
submerged combustion melting burners extending through the tank to melt glass feedstock into molten glass in the interior of the tank,
a batch inlet at an upstream end of the tank,
a molten glass outlet at a downstream end of the tank, and
an exhaust outlet; and
an exhaust system in fluid communication with the interior of the tank, and including:
a flue in fluid communication with the exhaust outlet, and
a hood in fluid communication with the flue and including:
a vertical portion downstream of and extending upwardly from the flue, and
a horizontal portion downstream of and extending away from the upstream vertical portion to establish a downstream horizontal exhaust path within the horizontal portion having an exhaust hood outlet, and including a lower wall with a protrusion that protrudes into the downstream horizontal exhaust path and has an excurvate upper surface to streamline flow of exhaust gas through the hood to prevent gas recirculation and formation of condensate piles in the hood.

22. The system of claim 21, wherein the protrusion is a block of material carried by the lower wall.

23. The system of claim 21, wherein the excurvate upper surface is hemispherical.

24. The system of claim 21, wherein the excurvate upper surface has an upstream-most edge and a downstream-most edge, wherein the upstream-most edge is closer to the vertical portion of the hood than the downstream-most edge is to the exhaust hood outlet as measured along a central longitudinal axis of the downstream horizontal exhaust path.

25. The system of claim 21, wherein an outer junction between the vertical portion of the hood and the horizontal portion of the hood is curved and defines an incurvate inner surface.

26. The system of claim 21, wherein an upper wall of the horizontal portion includes the exhaust hood outlet wherein the exhaust hood outlet has a sloped circumferential surface that converges in a downstream direction toward an outlet conduit.

27. The system of claim 21, wherein the horizontal portion of the hood includes a dilution air duct inlet extending through a side wall of the downstream horizontal portion.

28. The system of claim 27, wherein the exhaust system further includes a dilution air input duct having an outlet in fluid communication with a dilution air inlet of the hood.

29. The system of claim 28, wherein the horizontal portion of the hood includes a plurality of dilution air inlet ports in at least one of the side wall or a bottom wall of the horizontal portion of the hood.

30. The system of claim 29, wherein the plurality of dilution air inlet ports are located upstream of a central axis of the dilution air duct inlet.

31. The system of claim 21, further comprising at least one fluid jet extending through a rear end wall of the vertical portion of the hood and configured to deliver bursts of gas to break up or prevent condensation in the hood.

\* \* \* \* \*